United States Patent
Wang et al.

(10) Patent No.: US 6,880,841 B2
(45) Date of Patent: Apr. 19, 2005

(54) INTEGRATED WHEEL END FOR A WHEEL SUSPENSION OF A MOTOR VEHICLE

(75) Inventors: Hui Wang, Ann Arbor, MI (US); Douglas C. Myers, Canton, MI (US); Karl-Heinz Simons, Merzenich (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 56 days.

(21) Appl. No.: 10/361,361

(22) Filed: Feb. 10, 2003

(65) Prior Publication Data

US 2004/0155423 A1 Aug. 12, 2004

(51) Int. Cl.[7] .................................................. B62D 7/18
(52) U.S. Cl. .................................................. 280/93.512
(58) Field of Search ...................... 280/93.512, 93.51, 280/93.511, 124.125, 124.11, 124.113

(56) References Cited

U.S. PATENT DOCUMENTS

| | | | |
|---|---|---|---|
| 3,583,511 A | | 6/1971 | Asberg |
| 3,884,331 A | | 5/1975 | Asberg |
| 4,705,146 A | | 11/1987 | Tarter |
| 4,722,540 A | * | 2/1988 | Kozyra et al. ........ 280/124.136 |
| 4,878,683 A | * | 11/1989 | Dever ........................ 180/253 |
| 4,880,281 A | | 11/1989 | Merkelbach |
| 5,263,731 A | * | 11/1993 | Deutschel ............ 280/124.145 |
| 5,868,409 A | * | 2/1999 | Breuer .................. 280/93.512 |
| 6,138,357 A | * | 10/2000 | Jones ........................ 29/897.2 |
| 6,357,557 B1 | | 3/2002 | DiPonio |
| 6,379,050 B1 | | 4/2002 | Bertetti et al. |
| 6,450,585 B1 | | 9/2002 | Kochsick |
| 2002/0003071 A1 | | 1/2002 | Torii et al. |
| 2003/0098563 A1 | * | 5/2003 | Hacker .................. 280/93.512 |

FOREIGN PATENT DOCUMENTS

| | | |
|---|---|---|
| DE | 100 64 023 A1 | 7/2002 |
| JP | 2002-235757 | 8/2002 |
| JP | 2003-254362 | 9/2003 |

\* cited by examiner

Primary Examiner—Faye M. Fleming
(74) Attorney, Agent, or Firm—Brinks Hofer Gilson & Lione

(57) ABSTRACT

The present invention involves an integrated wheel end assembly for a wheel suspension of a motor vehicle. The integrated wheel end assembly comprises a rotor portion and a hub portion connected to the rotor portion. The rotor portion has a braking surface and an inside surface defining a center bore formed therethrough. The hub portion is disposed in the center bore circumferentially connected to the rotor portion and has inboard and outboard sides. The hub portion has a plurality of extensions radially extending therefrom to radially connect the rotor portion about the hub portion. The hub portion has an inner joint wall formed therethrough having a contour to define a joint bore for torque transfer about an axis. The hub portion has a collar extending from the inner joint wall at the inboard side. The collar has inner and outer sides. The outer side has an inboard inner raceway to house bearings. The inner side defines a receiving bore for rotation about the axis.

19 Claims, 5 Drawing Sheets

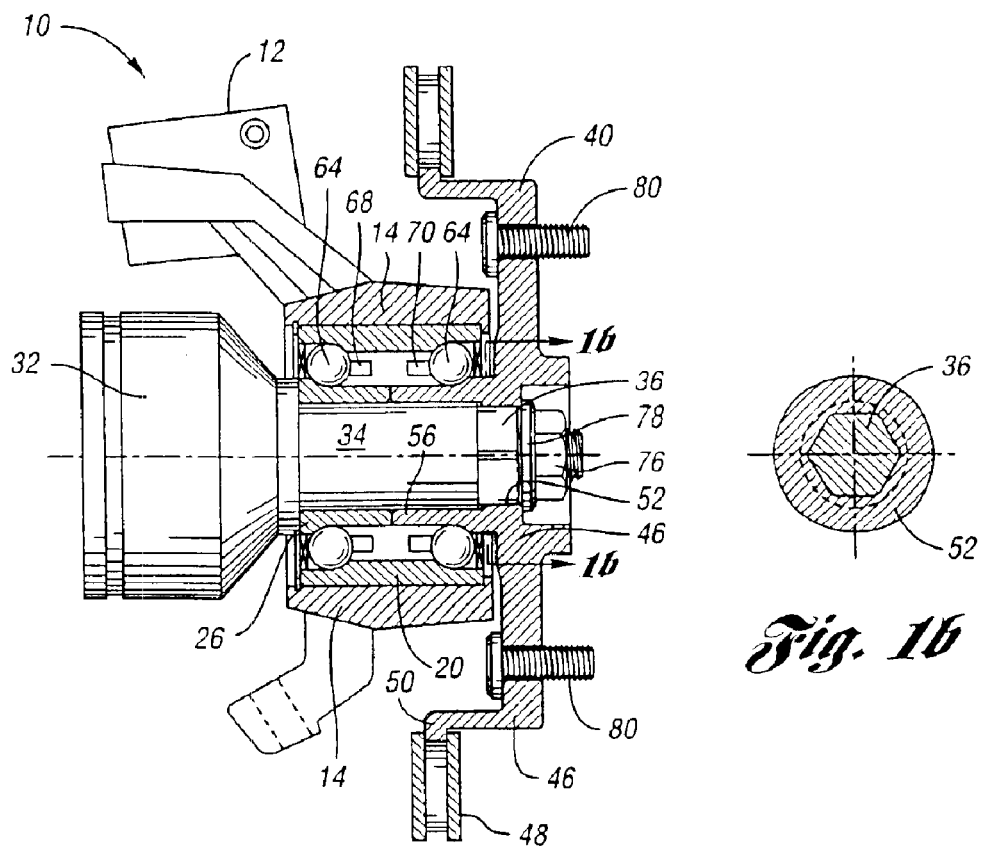
Fig. 1a
Fig. 1b
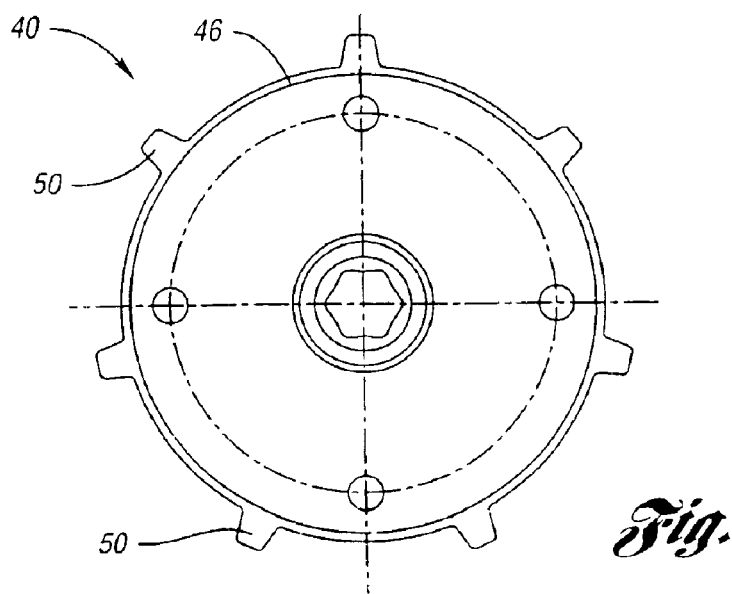
Fig. 3

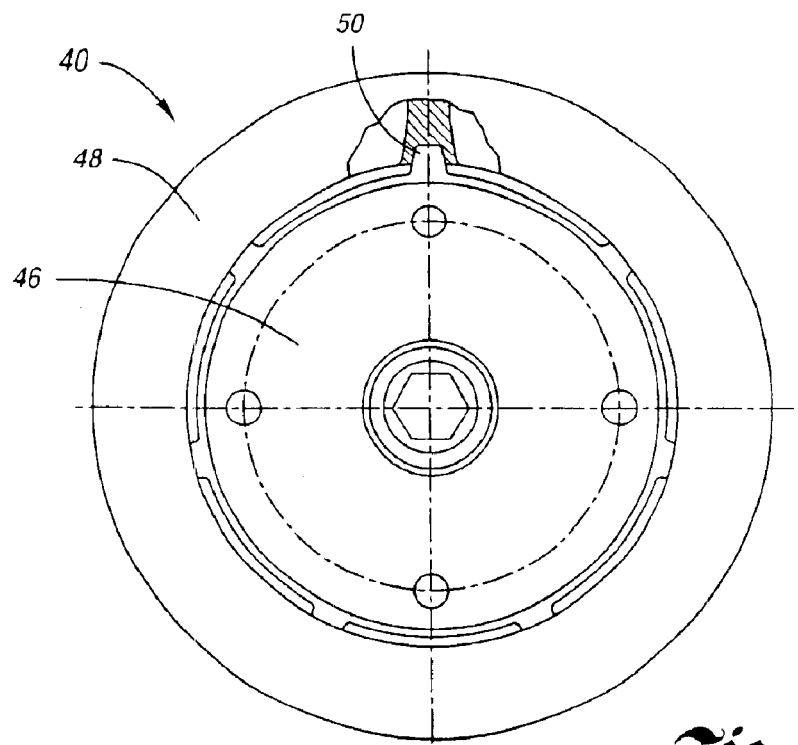
Fig. 4
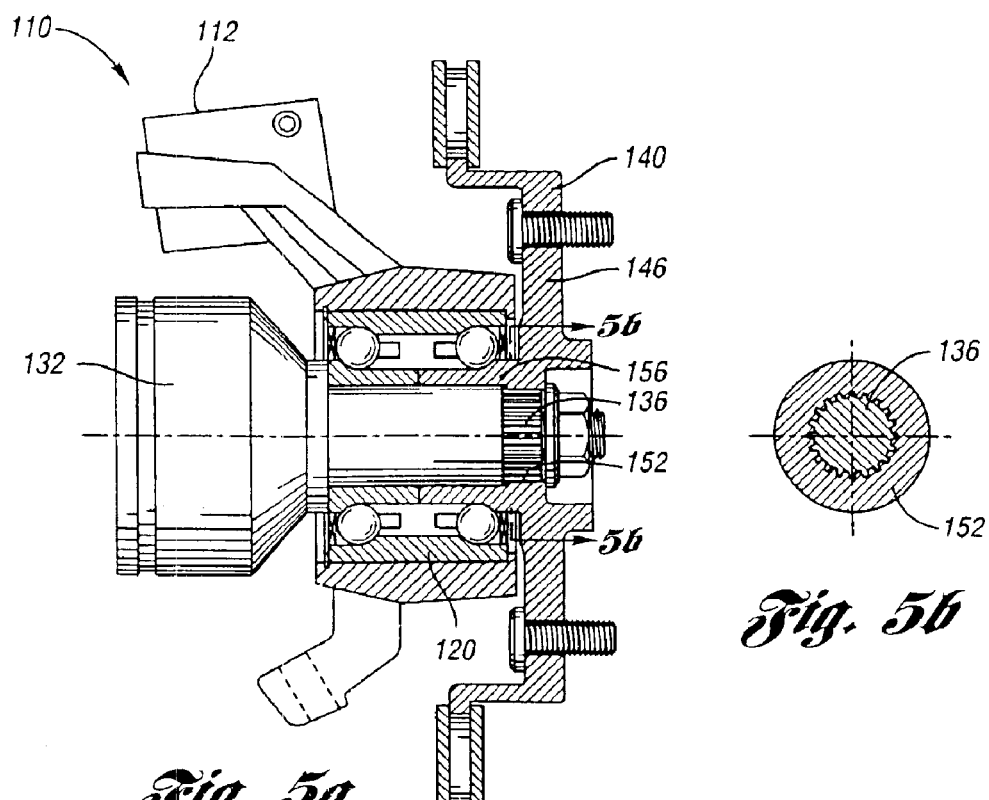
Fig. 5a
Fig. 5b

INTEGRATED WHEEL END FOR A WHEEL SUSPENSION OF A MOTOR VEHICLE

BACKGROUND OF THE INVENTION

The present invention is related to integrated wheel ends for wheel suspensions of motor vehicles.

Wheel ends and bearing assemblies for motor vehicles are known and have been widely used in the automotive industry for many years. A typical vehicle wheel end may include a bearing assembly which is disposed about a shaft and hub and mounted to a steering knuckle by means of fasteners or interference fittings. The bearing assembly is preloaded by a locking nut which secures the bearing assembly with the hub and the shaft.

Although current wheel end assemblies are adequate, wheel end manufacturers have been challenged with weight, mass, fretting, creeping, and bending issues. For example, during normal operation of the vehicle, in many cases, the wheel end axially moves or creeps along its rotational axis where bending is experienced. The results are undesirable. Moreover, many current designs of vehicle wheel ends include relatively high mass and volume.

BRIEF SUMMARY OF THE INVENTION

Thus, it is one aspect of the present invention to provide an integrated wheel end assembly for a motor vehicle wherein volume and mass are reduced relative to current wheel end designs.

It is another aspect of the present invention to provide an integrated wheel end assembly having reduced creeping, fretting, and bending moments along its rotational axis during normal operation.

It is yet another aspect of the present invention to provide an integrated wheel end assembly which has improved durability and longevity.

In one embodiment of the present invention, the integrated wheel end assembly includes a rotor portion having a braking surface and an inside surface defining a center bore formed therethrough. The integrated wheel end assembly further includes a hub portion disposed in the center bore and has extensions to circumferentially connect the hub portion to the rotor portion. The hub portion has inboard and outboard sides and extensions which radially extend therefrom. The extensions are insert-casted to the rotor portion at the inside surface to radially connect the rotor portion about the hub portion. The hub portion has an inner joint wall formed therethrough which has a contour to define a joint bore for torque transfer about a rotational axis. The hub portion further has a collar which extends from the inner joint wall at the inboard side. The collar has inner and outer sides wherein the outer side has an outboard inner raceway formed thereon to house bearings and the inner side defines a receiving bore for rotation about the axis.

Further aspects, features and advantages of the invention will become apparent from consideration of the following description and the appended claims when taken in connection with the accompanying drawings.

BRIEF DESCRIPTION OF THE DRAWINGS

FIG. 1a is a side cross-sectional view of an integrated wheel end assembly in accordance with one embodiment of the present invention;

FIG. 1b is a front cross-sectional view of the integrated wheel end assembly of FIG. 1a taken along lines a—a;

FIG. 3 is an outboard view of a hub portion of the wheel end assembly shown in FIG. 1a;

FIG. 4 is a break-away view depicting an in-cast of hub and rotor portions in accordance with one embodiment of the present invention;

FIG. 5a is a side cross-sectional view of an integrated wheel end assembly in accordance with another embodiment of the present invention;

FIG. 5b is a front cross-sectional view of the integrated wheel end assembly of FIG. 5a taken along lines b—b;

DETAILED DESCRIPTION OF THE INVENTION

The present invention generally provides an improved integrated wheel end assembly for a wheel suspension of a motor vehicle. The wheel end assembly includes a wheel end or wheel portion having a hub portion radially connected to a rotor portion by insert-casting. The hub portion has a receiving bore which receives an end portion of a half shaft or stub shaft for torque or load transfer. The hub portion includes an inboard extending collar which is disposed about the shaft and abuts an inboard inner race of a bearing assembly. In use, the collar reduces rotational movement of the wheel end to reduce fretting, creeping, coning, and bending at a connection joint of the wheel end and the drive shaft. A hub portion of the wheel end is also made of steel which allows a reduced volume and a lighter weight design of the wheel end assembly.

Figure 2:
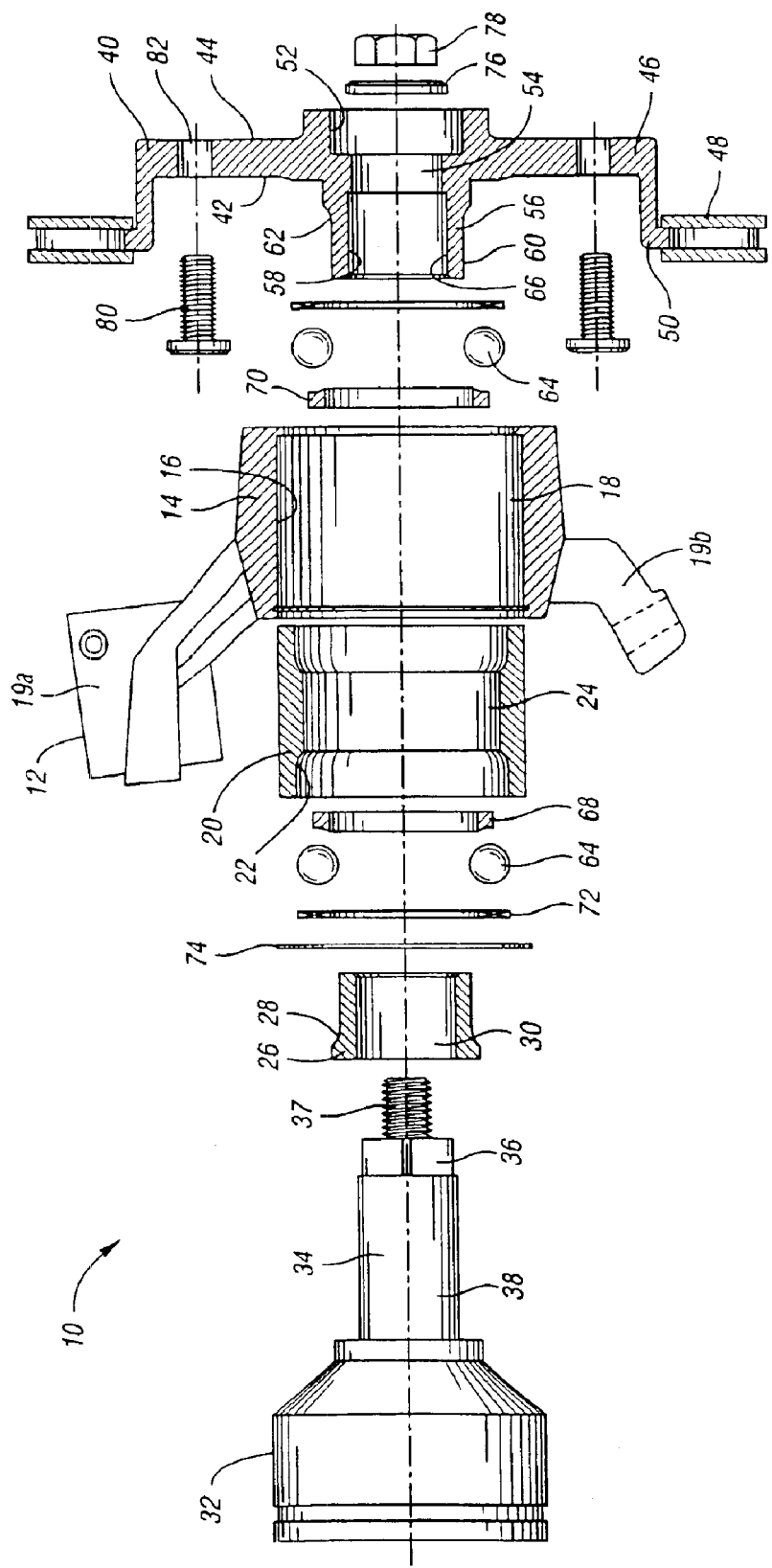
FIG. 2 is an exploded view of the integrated wheel end assembly depicted in FIGS. 1a–b.

FIGS. 1a–2 illustrate an integrated wheel end assembly 10 for a wheel suspension of a motor vehicle in accordance with one embodiment of the present invention. As shown, the integrated wheel end assembly 10 includes a steering knuckle 12 including a body 14 having an inner wall 16 formed therethrough to define a center bore 18 of the body 14. The steering knuckle 12 further includes first and second knuckle arms 19a, 19b to be mounted to a strut or an upper control arm and a lower control arm (not shown), respectively, of the motor vehicle.

As shown in FIGS. 1a–2, the assembly 10 further includes a bearing assembly having an outer race 20 disposed on the inner wall 16 in the center bore 18. As shown, based on the configuration, the assembly 10 may be identified as a generation three or "GEN III" assembly. In this embodiment, the outer race 20 has an inboard outer raceway 22 and an outboard outer raceway 24 formed thereon. The bearing assembly further includes an inboard inner race 26 disposed in the center bore 18. The inboard inner race 26 has an inboard inner raceway 28 formed thereon and cooperates with the inboard outer raceway 22 of the outer race 20 to house bearings therein to allow axial rotation of a shaft. The inboard inner race 26 has a first receiving bore 30 formed therethrough to receive and be cooperate about a half shaft (as described in greater detail below), defining an axis of rotation.

The integrated wheel end assembly 10 further includes a half shaft 32 disposed through the first receiving bore 30 defining an axis of rotation. The half shaft 32 has a body portion 34 and an end portion 36 extending outboard from the body portion 34. The end portion 36 has a contour shape for transmitting torque or load to a wheel end (discussed below). The body portion 34 has an outer surface 38 about which the inboard inner race 26 is disposed for rotation about the axis.

In this embodiment, the drive shaft is a half shaft for a driven wheel. It is to be noted that the drive shaft 32 may be any conventional drive shaft for a driven or non-driven wheel end, e.g., stub shaft, without falling beyond the scope or spirit of the present invention.

The integrated wheel end assembly 10 further includes a wheel end 40 having inboard and outboard sides 42, 44. As shown in FIGS. 1a–3, wheel end 40 further includes a hub portion 46 and a rotor portion 48 radially connected to the hub portion 46. In this embodiment, the hub portion 46 has a plurality of extensions 50 radially extending therefrom and insert-casted to the rotor portion 48 to radially connect the hub portion 46 to the rotor portion 48.

The hub portion 46 has an inner joint wall 52 formed therethrough. The inner joint wall 52 has a contour shape formed thereon to define a connecting bore 54 in which the contour shape of the end portion 36 of the drive shaft 32 is disposed to transmit torque or load and rotate the wheel end or wheel portion 40 about the axis. The contour of the inner joint wall 52 cooperates with the contour of the end portion 36 to provide torque or load transfer about the axis of rotation when the half shaft is driven. In this embodiment, the contour of the inner joint wall 52 and the end portion 36 is a polygonal shape. As shown, the connecting bore 54 of the wheel end 40 mates with the polygonal shape of the end portion 36 for torque transfer.

The hub portion 46 has a collar 56 which extends from the inner joint wall 52 at the inboard side 42. As the end portion and the inner joint wall cooperate, the collar 56 receives the body portion 34 and abuts the inboard inner race 26. As described in greater detail below, when a locking nut tightens the assembly 10, a preload is defined on the wheel end assembly. As shown, the collar 56 has inner and outer sides 58, 60. The outer side 60 has an outboard inner raceway 62 formed thereon. The outer side 60 cooperates with the outboard outer raceway 24 of the outer race 20 to house balls 64 therein. The inner side 58 has an inner diameter defining a second receiving bore 66 to receive the body portion 34 of the half shaft 32 which rotates and transfers load to the wheel end at the inner joint wall 52.

As shown, assembly 10 further includes inboard and outboard cages 68, 70 separating the balls between inboard and outboard sides. As shown, assembly 10 further includes seals 72. Moreover, retaining ring 74 is housed within integrated wheel end assembly 10 to maintain load on the wheel end assembly. As shown, locking nut 78 secures washer 76 about thread 37 of half shaft 32 defining a load on the bearing assembly. As known in the art, wheel studs 80 are inserted through mounting holes 82 of hub portion 46 to mount vehicle wheels thereto.

In this embodiment, the hub portion is made of materials including steel and steel alloy. Such materials provide strength to the wheel end during torque transfer and allows a reduction of mass and volume. However, other suitable materials may be used without falling beyond the scope or spirit of the present invention. In this embodiment, the rotor portion may be made of materials including grey cast iron, aluminum, or aluminum alloy. However, any other suitable material may be used without falling beyond the scope or spirit of the present invention.

FIGS. 5a–5b illustrate another embodiment of the integrated wheel end in accordance with the present invention. In this embodiment, the integrated wheel end 140 has a hub portion 146 having an inner joint wall 152 with a spline contour. Thus, the contour shape of the end portion 136 and the contour shape of the inner joint wall 152 is a spline to matingly connect the end portion 136 with the inner joint wall 152 and to transfer load.

As shown, the components of the integrated wheel end assembly 110 are similar to the integrated wheel end assembly 10 in FIGS. 1a–1b. For example, the steering knuckle 12, the outer race 20, the shaft 32, and the wheel end 40 of assembly 10 are the same as steering knuckle 112, outer race 120, drive shaft 132, and wheel end 140 of assembly 110.

Figure 6A:
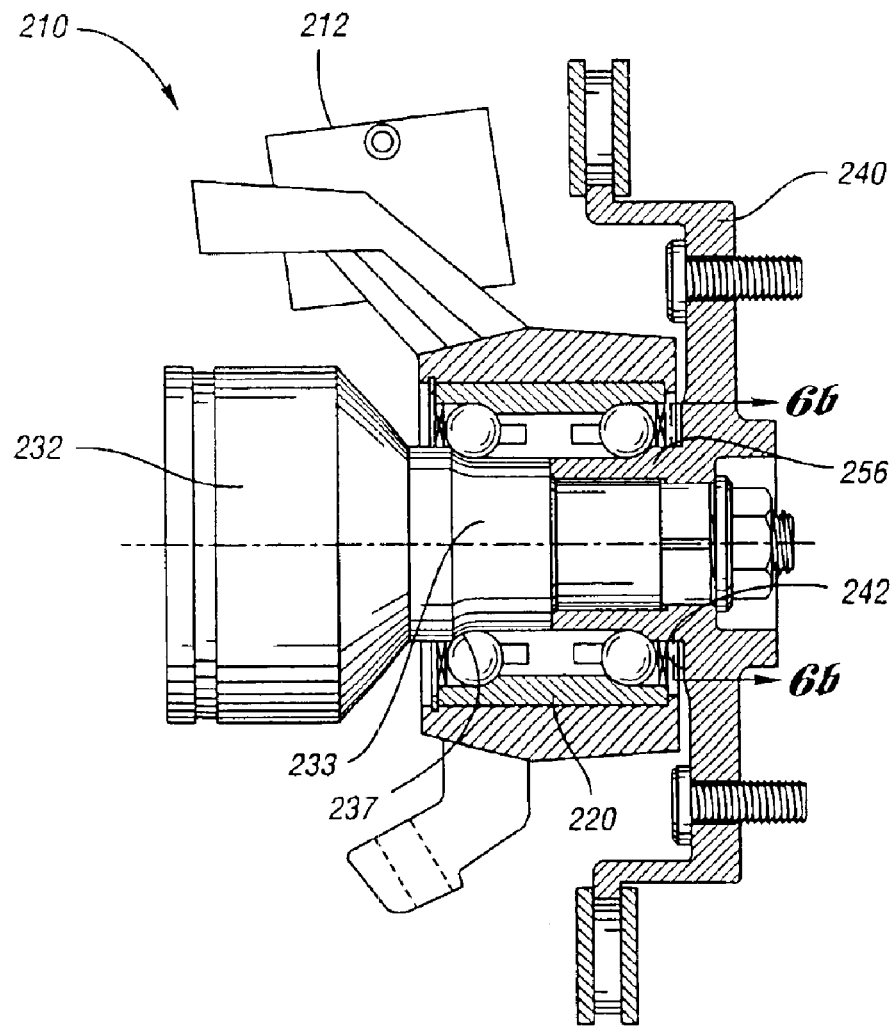
FIG. 6a is a side cross-sectional view of an integrated wheel end assembly in accordance with yet another embodiment of the present invention.
Figure 6B:
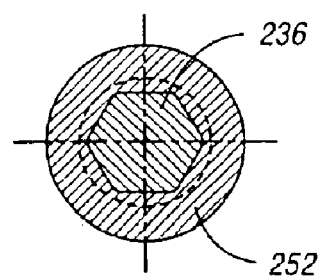
FIG. 6b is a front cross-sectional view of the integrated wheel end assembly of FIG. 6a taken along lines c—c and FIG. 7 is an exploded view of the integrated wheel end assembly depicted in FIGS. 6a–b.
Figure 7:
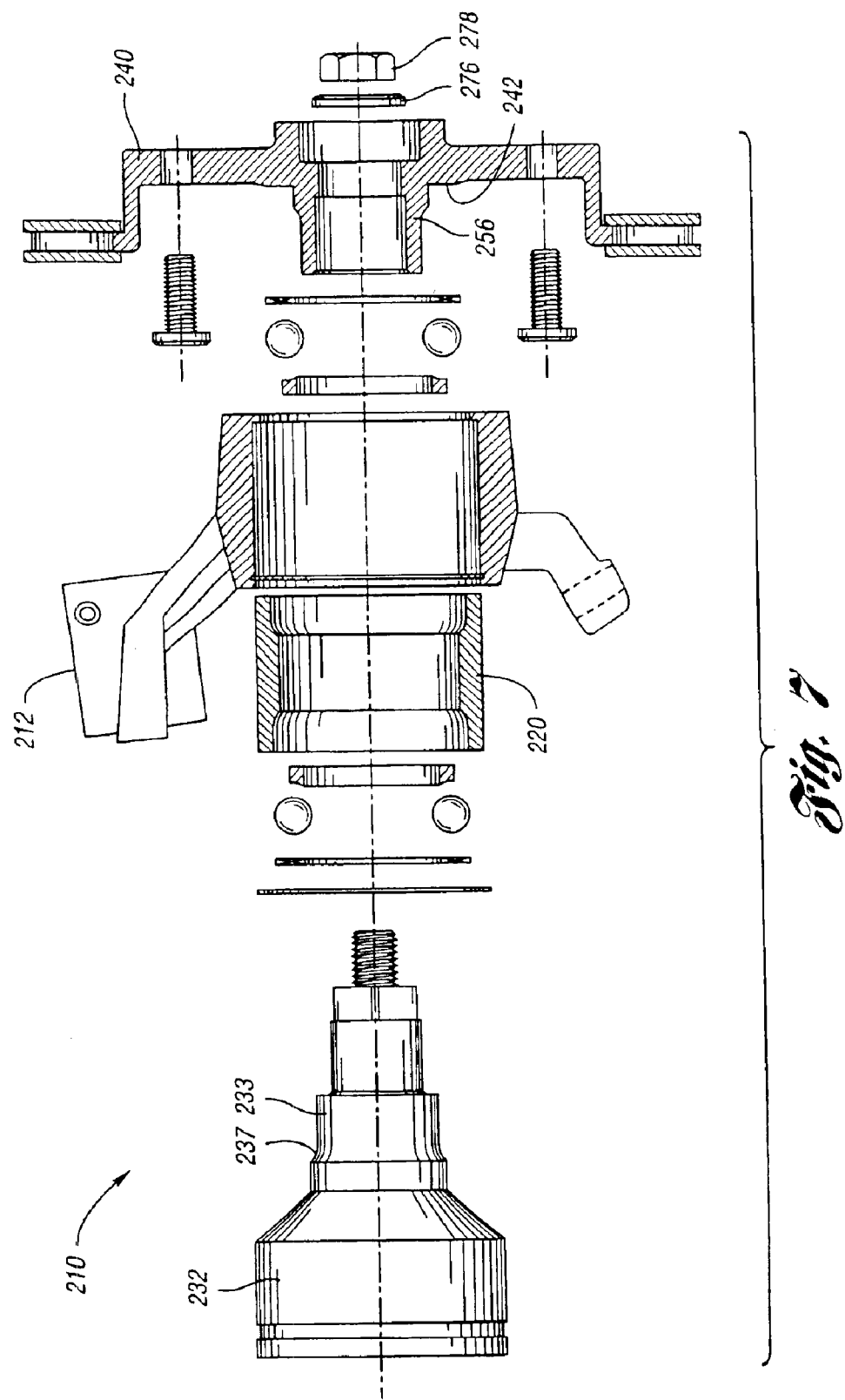

FIGS. 6a–7 illustrate another embodiment of the integrated wheel end assembly in accordance with the present invention. As shown, the components of the integrated wheel end assembly 210 are similar to the integrated wheel end assembly 10 in FIGS. 1a–1b. For example, the steering knuckle 12, the outer race 20, the shaft 32, and the wheel end 40 of assembly 10 are the same as steering knuckle 212, outer race 220, shaft 232, and wheel end 240 of assembly 210. However, in this embodiment, the shaft 232 includes an integral inboard portion 233 having an inboard inner raceway 237 formed thereon thereby eliminating a separate inner race as mentioned in the embodiment described above. A collar 256 extends from the inboard side 242 of wheel end 240 and abuts the integral inboard portion 233 when disposed about shaft 232. As shown, based on the configuration, the assembly may be identified as a generation four or "GEN IV" assembly.

In this embodiment, the integrated wheel end has a modified polygon connection. That is, the contour of the end portion 236 and the contour of the inner joint wall 252 is a modified polygon shape to matingly connect the end portion 236 with the inner joint wall 252. As a result, the wheel end assembly 210 of the present invention is lighter in weight, smaller in volume, and more efficient in load transfer. Moreover, the wheel end assembly 210 of the present invention has reduced axial movement including fretting, creeping, coning and bending movements providing improved performance of the vehicle.

Further aspects, features and advantages of the invention will become apparent from consideration of the following description and the appended claims when taken in connection with the accompanying drawings.

What is claimed is:

1. An integrated wheel end assembly for a wheel suspension of a motor vehicle, the integrated wheel end comprising:
   a rotor portion having a braking surface and an inside surface defining a center bore formed therethrough;
   a hub portion disposed in the center bore circumferentially connected to the rotor portion and having inboard and outboard sides, the hub portion having extensions radially extending therefrom and insert-casted to the inside surface to radially connect the rotor portion about the hub portion, the hub portion having an inner joint wall formed therethrough having a contour to define a connecting bore for torque transfer about an axis, the hub portion having a collar extending from the inner joint wall at the inboard side, the collar having inner and outer sides, the outer side having an outboard inner raceway to house bearings, the inner side defining a receiving bore for rotation about the axis.

2. The integrated wheel end assembly of claim 1 further comprising:

a steering knuckle including a body having an inner wall formed therethrough to define a center bore of the body;

an outer race disposed on the inner wall in the center bore, the outer race having inboard and outboard outer raceways formed thereon;

an inboard inner race disposed in the center bore, the inboard inner race having an inboard raceway formed thereon and cooperating with the inboard raceways of the outer race to house bearings therein to define a bearing assembly, the inboard inner race having a first receiving bore formed therethrough; and a drive shaft disposed through the first receiving bore, the drive shaft having a body portion and an end portion extending from the body portion, the end portion having a contour for transmitting torque, the body portion having an outer surface to which the inboard inner race is disposed.

3. The integrated wheel end assembly of claim 2 wherein the collar of the hub portion abuts the inboard inner race and cooperates with the outboard outer raceway of the outer race, the collar being configured to receive the body of the drive shaft allowing the end portion to be disposed in the connecting bore for transmitting torque.

4. The integrated wheel assembly end of claim 2 further comprising a locking nut securable to the end portion to define a load on the bearing assembly.

5. The integrated wheel end assembly of claim 1 wherein the hub portion includes mounting holes for mounting vehicle wheels to thereto.

6. The integrated wheel end assembly of claim 2 wherein the contour of the inner joint wall of the hub portion and the end portion of the drive shaft is polygonal.

7. The integrated wheel end assembly of claim 2 wherein the contour of the inner joint wall of the hub portion and the end portion of the drive shaft is a spline.

8. The integrated wheel end assembly of claim 1 wherein the hub portion is made of materials including steel and steel alloy.

9. The integrated wheel end assembly of claim 1 wherein the rotor portion is made of materials including grey cast iron, aluminum, and aluminum alloy.

10. The integrated wheel end assembly of claim 1 further comprising:

a steering knuckle including a body having an inner wall formed therethrough to define a center bore of the body;

an outer race disposed on the inner wall in the center bore, the outer race having inboard and outboard outer raceways formed thereon; and a drive shaft disposed through the first receiving bore, the drive shaft having a body portion and an end portion extending from the body portion, the end portion having a contour for transmitting torque, the body portion including an integral inboard portion having an inboard inner raceway formed thereon.

11. An integrated wheel end assembly for a wheel suspension of a motor vehicle, the integrated wheel end assembly comprising:

a steering knuckle including a body having an inner wall formed therethrough to define a center bore of the body;

an outer race disposed on the inner wall in the center bore, the outer race having inboard and outboard outer raceways formed thereon;

an inboard inner race disposed in the center bore, the inboard inner race having an inboard raceway formed thereon and cooperating with the inboard raceways of the outer race to house bearings therein, the inboard inner race having a first receiving bore formed therethrough;

a drive shaft disposed through the first receiving bore, the drive shaft having a body portion and an end portion extending outboard from the body portion, the end portion having a contour for transmitting torque, the body portion having an outer surface to which the inboard inner race is disposed; and a wheel end having inboard and outboard sides and including a hub portion and a rotor portion radially connected to the hub portion, the hub portion having extensions radially extending therefrom and in-casted to the rotor portion connecting the hub portion with the rotor portion, the hub portion having an inner joint wall formed therethrough, the inner joint wall having a contour formed thereon to define a connecting bore in which the end portion of the drive shaft is disposed to transmit torque, the hub portion having a collar extending from the inner joint wall at the inboard side and abutting the inboard inner race, the collar having inner and outer sides, the outer side having an outboard inner raceway cooperating with the outboard outer raceway of the outer race to house bearings therein, the inner side defining a second receiving bore to receive the body of the drive shaft for rotational movement thereabout as the wheel end receives torque transferred from the drive shaft at the inner joint wall.

12. The integrated wheel end assembly of claim 11 further comprising a locking nut securable to the end portion to define a load on the bearing assembly.

13. The integrated wheel end assembly of claim 11 wherein the hub portion includes mounting holes for mounting vehicle wheels to thereto.

14. The integrated wheel end assembly of claim 12 wherein the contour of the inner joint wall of the hub portion and the end portion of the drive shaft is polygonal.

15. The integrated wheel end assembly of claim 12 wherein the contour of the inner joint wall of the hub portion and the end portion of the drive shaft is a spline.

16. The integrated wheel end assembly of claim 11 wherein the hub portion is made of materials including steel, steel alloy, aluminum, and aluminum alloy.

17. The integrated wheel end assembly of claim 11 wherein the rotor portion is made of materials including nodular cast iron.

18. The integrated wheel end assembly of claim 11 wherein the inside diameter of the second receiving bore is greater than the inside diameter of the connecting bore.

19. The integrated wheel end assembly of claim 11 wherein the contour of the drive shaft is formed along the end portion.

* * * * *